(12) United States Patent
Abdolkhani et al.

(10) Patent No.: US 10,396,596 B2
(45) Date of Patent: Aug. 27, 2019

(54) TRANSMITTER FOR INDUCTIVE POWER TRANSFER SYSTEMS

(71) Applicant: Apple Inc., Cupertino, CA (US)

(72) Inventors: Ali Abdolkhani, Auckland (NZ); Aiguo Hu, Auckland (NZ); Ya-Ting Wang, Auckland (NZ); Arunim Kumar, Auckland (NZ)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 15/036,656

(22) PCT Filed: Nov. 7, 2014

(86) PCT No.: PCT/NZ2014/000230
§ 371 (c)(1),
(2) Date: May 13, 2016

(87) PCT Pub. No.: WO2015/072863
PCT Pub. Date: May 21, 2015

(65) Prior Publication Data
US 2016/0308394 A1    Oct. 20, 2016

(30) Foreign Application Priority Data
Nov. 13, 2013    (NZ) ........................................ 617742

(51) Int. Cl.
*H02J 7/00*        (2006.01)
*H02J 7/14*        (2006.01)
(Continued)

(52) U.S. Cl.
CPC .............. *H02J 50/12* (2016.02); *H01F 38/14* (2013.01); *H02J 7/0042* (2013.01); *H02J 7/025* (2013.01);
(Continued)

(58) Field of Classification Search
USPC ........ 320/107, 108, 109, 113, 114, 115, 116, 320/134
See application file for complete search history.

(56) References Cited

U.S. PATENT DOCUMENTS 5,000,178 A    3/1991  Griffith
5,496,036 A    3/1996  Chester
(Continued)

FOREIGN PATENT DOCUMENTS

CN    101461114         6/2009
CN    103003897 A       3/2013
(Continued)

OTHER PUBLICATIONS

European Search Report for EP Application No. 14862710.2 dated May 31, 2017 (9 pages).
(Continued)

*Primary Examiner* — Alexis B Pacheco (57) ABSTRACT

An inductive power transmitter having a plurality of transmitting coils for generating an alternating magnetic field arranged in a row with each transmitting coil partially overlapping with adjacent transmitting coils in the row. A transmitting circuit connected to each transmitting coil may drive the transmitting coils so that each transmitting coil's alternating magnetic field is phase shifted with respect to the alternating magnetic field of adjacent transmitting coils in the row or so that the alternating magnetic field generated by the transmitting coils travels along a charging surface.

22 Claims, 8 Drawing Sheets

(51) Int. Cl.
*H02J 50/12* (2016.01)
*H02J 50/40* (2016.01)
*H01F 38/14* (2006.01)
*H02J 7/02* (2016.01)
*H04B 5/00* (2006.01)
*H02J 5/00* (2016.01)

(52) U.S. Cl.
CPC ............ *H02J 50/40* (2016.02); *H04B 5/0037* (2013.01); *H04B 5/0081* (2013.01); *H02J 5/005* (2013.01)

(56) References Cited

U.S. PATENT DOCUMENTS

| | | | |
|---|---|---|---|
| 5,519,262 | A | 5/1996 | Wood |
| 6,151,231 | A | 11/2000 | Saint-Pierre et al. |
| 6,320,772 | B1 | 11/2001 | Doyama et al. |
| 2005/0068019 | A1 | 3/2005 | Nakamura et al. |
| 2005/0116683 | A1* | 6/2005 | Cheng ................ H01F 3/02 320/108 |
| 2005/0133497 | A1 | 6/2005 | Makoto |
| 2007/0064406 | A1 | 3/2007 | Beart |
| 2009/0096413 | A1* | 4/2009 | Partovi ............... H01F 5/003 320/108 |
| 2010/0109604 | A1 | 5/2010 | Boys et al. |
| 2010/0259217 | A1 | 10/2010 | Baarman et al. |
| 2010/0328044 | A1* | 12/2010 | Waffenschmidt ....... H02J 7/025 340/10.4 |
| 2011/0181118 | A1 | 7/2011 | Chen et al. |
| 2012/0098485 | A1 | 4/2012 | Kang et al. |
| 2013/0026850 | A1 | 1/2013 | Throngnumchai et al. |
| 2013/0030892 | A1 | 1/2013 | Liu et al. |
| 2013/0049456 | A1 | 2/2013 | Kim et al. |
| 2013/0119773 | A1 | 5/2013 | Davis |
| 2013/0229061 | A1* | 9/2013 | Budhia ............... H01F 38/14 307/104 |
| 2014/0091755 | A1 | 4/2014 | Walley et al. |
| 2014/0197687 | A1* | 7/2014 | Lin .................... H02J 5/005 307/31 |

FOREIGN PATENT DOCUMENTS

| | | |
|---|---|---|
| GB | 2388716 | 11/2003 |
| JP | H06277358 | 10/1994 |
| JP | 2846090 B2 | 1/1999 |
| JP | 2001044054 | 2/2001 |
| JP | 2002246248 | 8/2002 |
| JP | 2006042519 | 2/2006 |
| JP | 2006128381 | 5/2006 |
| JP | 2007505480 | 3/2007 |
| JP | 2009-164293 | 7/2009 |
| JP | 2011229360 | 11/2011 |
| JP | 2011229360 A | 11/2011 |
| JP | 2013534040 A | 8/2013 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 200712632 | 11/2007 |
| WO | 2008137996 A1 | 11/2008 |
| WO | 2008140333 | 11/2008 |
| WO | 2009004587 A2 | 4/2009 |
| WO | 2010090539 | 8/2010 |
| WO | 2011016736 | 2/2011 |
| WO | 2011016737 | 2/2011 |
| WO | 2011016737 A1 | 2/2011 |
| WO | 2012150293 | 11/2012 |
| WO | 2013036146 A1 | 3/2013 |
| WO | 2013122483 A1 | 8/2013 |
| WO | 2014083015 A1 | 6/2014 |

OTHER PUBLICATIONS

International Search Report for International Application No. PCT/NZ2014/000230 dated Feb. 6, 2015 (3 pages).

Abdolkhani et al. "Wireless Charging Pad based on Traveling Magnetic Field for Portable Consumer Electronics." IEEE, 2013 pp. 1416-1421.

Budhia, et al., "Development of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

Chinese Office Action for CN Application No. 201480062260.X dated Jul. 3, 2017 (8 pages).

Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

\* cited by examiner

TRANSMITTER FOR INDUCTIVE POWER TRANSFER SYSTEMS

This application is a National Stage Application of PCT/NZ2014/000230, filed 7 Nov. 2014, which claims benefit of Serial No. 617742, filed 13 Nov. 2013 in New Zealand and which applications are incorporated herein by reference. To the extent appropriate, a claim of priority is made to each of the above disclosed applications.

FIELD OF THE INVENTION

The present invention is in the field of inductive power transfer (IPT) systems. More particularly, the invention relates to an inductive power transmitter for use in such systems.

BACKGROUND OF THE INVENTION

IPT technology is an area of increasing development and IPT systems are now utilised in a range of applications and with various configurations. One such application is the use of IPT systems in so called 'charging mats'. Such charging mats will normally provide a planar charging surface onto which portable electronic devices (such as smartphones or PDAs) may be placed to be charged or powered wirelessly.

Typically, the charging mat will include a transmitter having one or more transmitting coils arranged parallel to the planar charging surface of the charging mat. The transmitter drives the transmitting coils so that the transmitting coils generate a time-varying magnetic field in the immediate vicinity of the planar surface. When portable electronic devices are placed on or near the near the planar surface, the time-varying magnetic field will induce an alternating current in the receiving coil of a suitable receiver associated with the device (for example a receiver incorporated into the device itself). The received power may then be used to charge a battery, or power the device or some other load.

A problem associated with charging mat design is ensuring that the inductive power transfer is adequately efficient. One approach is to require precise alignment between the transmitting coil and the receiving coil. This may be achieved, for example, by having markings or indentations on the planar charging surface so that when a user places the device on the charging mat alignment between the coils can be guaranteed. However, this approach is not ideal since it requires the user to place their device carefully onto the charging mat. Further, if a charging mat is to be used by multiple devices, then there needs to be a suitable number of transmitting coils arranged in the charging mat.

Another approach is to have a single large transmitting coil which corresponds to the entire surface of the charging mat. In this instance, one or more devices may be placed anywhere on the surface of the charging mat. This allows more freedom in terms of where a user may place a device on the charging mat. However, the magnetic field produced by a large transmitting coil may not be uniform, with 'weak spots' towards the centre of the charging mat.

Another approach is to have an array of smaller transmitting coils. The charging mat detects the position of the device using a suitable detection mechanism and activates the most proximate transmitting coil or coils. Though this allows more freedom in terms of where a user may place a device, it requires that each transmitting coil can be driven individually and separate detection circuitry which makes the charging mat more complex and expensive. Also, the boundary between adjacent transmitting coils can result in deadspots due to the cancelling effects of adjacent coils whereby receivers do not receiver sufficient power.

Another aspect of charging mat design is consideration of the relative orientation of the transmitting coils and receiving coils. For the approaches discussed above, the receiving coil will typically need to be parallel with the transmitting coil. This is usually achieved by positioning the receiving coil in the portable electronic device such that when the device is placed on the charging mat in the normal way the receiving coil is parallel to the surface of the charging mat and the transmitting coils. However, in some scenarios when a device is placed on the charging mat the receiving coil may not be parallel to the planar surface. This may be due to the device been placed incorrectly, the receiver been adapted for another type of transmitter (such as a charging enclosure), or for any other reason. Mis-orientation may result in less efficient power transfer.

The present invention provides a transmitter for a charging mat that resolves at least some of the problems identified above. In particular, a charging mat that produces a magnetic field which can transfer power to multiple devices placed onto the charging mat regardless of their orientation, with minimal deadspots, or at least provides the public with a useful choice.

SUMMARY OF THE INVENTION

According to one exemplary embodiment there is provided an inductive power transmitter including: a plurality of transmitting coils for generating an alternating magnetic field, wherein the plurality of transmitting coils are arranged in a row and each transmitting coil partially overlaps with adjacent transmitting coils in the row; and a transmitting circuit connected to each transmitting coil for driving the transmitting coils so that each transmitting coil's alternating magnetic field is phase shifted with respect to the alternating magnetic field of adjacent transmitting coils in the row.

According to another exemplary embodiment there is provided an inductive power transmitter including: a plurality of transmitting coils for generating an alternating magnetic field, wherein the plurality of transmitting coils are arranged in a row and each transmitting coil partially overlaps with adjacent transmitting coils in the row; and a transmitting circuit connected to each transmitting coil for driving the transmitting coils so that the alternating magnetic field generated by the transmitting coils travels along a charging surface.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
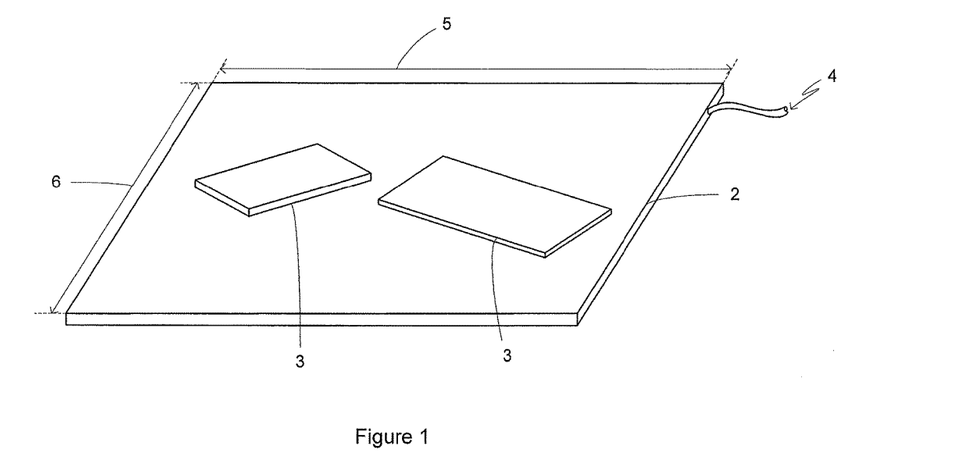
FIG. 1 shows a charging mat according to one embodiment.

FIG. 1 shows a charging mat 1. The charging mat includes a planar charging surface 2 onto which portable electronic devices 3 may be placed to be charged or powered wirelessly using an inductive power transfer (IPT) system that will be described in more detail below. The charging mat may be connected to a suitable power supply 4, for example, mains power or an external drive circuit.

It will be appreciated that charging mats may be known by many different names (such as charging pads, power pads or even simply as charging surfaces). The term 'charging mat' will be used for the remainder of this specification in its broadest sense, encompassing all other apparatuses for inductive power transfer which include a generally planar surface onto which devices may be placed to be charged or powered. Charging mats may also include other apparatus that include a charging surface, for example laptops with an integrated charging surface or benches, tables and other surfaces with integrated charging surfaces.

Similarly, those skilled in the art will appreciate that the term portable electronic device encompasses many types of devices. Without limiting the scope of the term, some exemplary portable electronic devices may include mobile phones, tablets, PDAs, remotes, laptops, cameras, gaming devices and watches.

The charging mat 1 of FIG. 1 includes an inductive power transmitter (not shown) that will be discussed in more detail below. For the sake of this specification, the transmitter will be discussed as distinct from the body of the charging mat itself. However, it will be appreciated that it is equally correct to consider the charging mat as part of the transmitter. Further, the portable electronic devices 3 include inductive power receivers (not shown) that will be discussed in more detail below. It will be appreciated that generally the inductive power transmitter and the inductive power receiver(s) together form an IPT system, such that when the inductive power transmitter is suitably coupled with the inductive power receiver, power may be inductively (or wirelessly) transferred from the inductive power transmitter to the inductive power receiver(s).

The charging mat 1 of FIG. 1 is generally rectangular. For the remainder of this specification, the charging mat and inductive power transmitter will be discussed in the context of a rectangular charging mat. However, those skilled in the art will appreciate how the invention may be adapted to work with other geometries of charging mat. Without limiting the scope of the invention, the charging mat may be, for example, circular, square or an irregular shape.

In FIG. 1, the charging surface 2 corresponds to the entire top face of the charging mat 1, and therefore it is also generally rectangular. For the remainder of this specification, the charging surface and inductive power transmitter will be discussed in the context of a rectangular charging surface. However, it will be appreciated that the charging surface may not necessarily be the same size as the charging mat (for example, the charging surface may be smaller than the charging mat and surrounded by a border) or the same shape as the charging mat (for example, the charging mat may be square with a circular charging surface). For the sake of this description it is helpful to define two dimensions of the charging surface, as shown in FIG. 1, the charging surface length 5 and the charging surface width 6. Those skilled in the art will appreciate how any discussion in this specification in the context of these dimensional constraints may be adapted for charging surfaces having different dimensional constraints (for example, an oval charging surface whose length may correspond to its long axis and whose width may correspond to its short axis).

Figure 2:
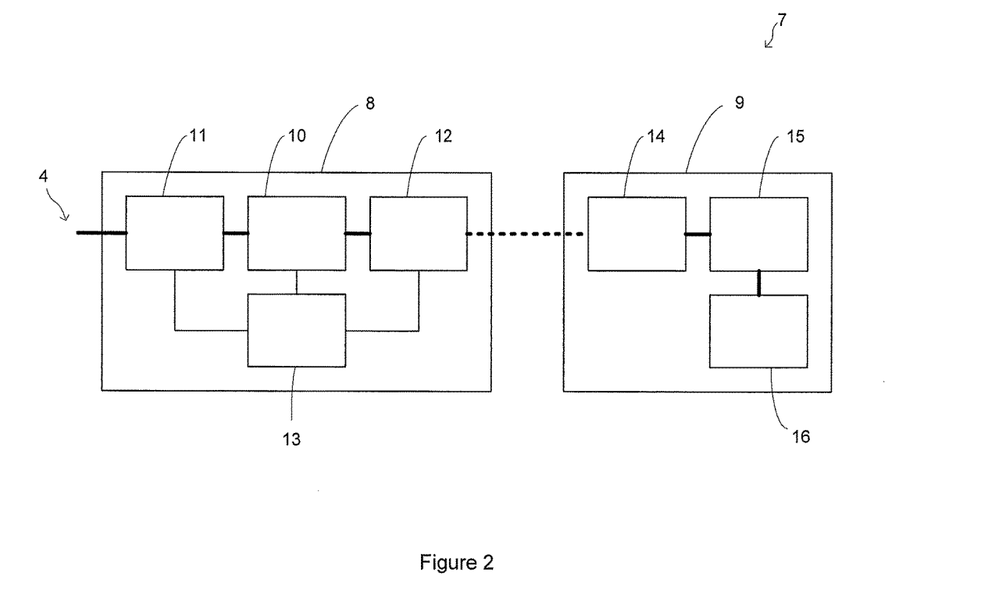
FIG. 2 shows a block diagram showing a general representation of an IPT system.

FIG. 2 shows a block diagram showing a general representation of an IPT system 7. The IPT system includes an inductive power transmitter 8 and an inductive power receiver 9. The inductive power transmitter includes a transmitting circuit 10 that is connected to an appropriate power supply. In FIG. 2 this is shown as an AC-DC converter 11 that is in turn connected to the mains power supply 4. The transmitting circuit is connected to transmitting coils 12. The transmitting circuit drives the transmitting coils with an alternating current such that the transmitting coils generate a time-varying magnetic field. In some configurations, the transmitting coils may also be considered to be a part of the transmitting circuit, but for the sake of clarity this description will refer to them as distinct. The transmitting coils may be may be connected to capacitors (not shown) either in parallel or series to create a resonant circuit. The particular configuration of the transmitting coils and the transmitting circuit will be described in more detail below.

FIG. 2 also shows a controller 13 within the inductive power transmitter. The controller can be connected to each part of the inductive power transmitter. The controller is adapted to receive inputs from each part of the inductive power transmitter and produce outputs that control the way each part of the inductive power transmitter operates. The controller may include a memory. The controller is preferably a programmable logic controller that is programmed to perform different computational tasks depending on the requirements of the IPT system.

FIG. 2 also shows an inductive power receiver 9. The inductive power receiver includes a receiving coil 14 that is suitably connected to receiving circuitry 15 that in turn supplies power to the load 16. The load may be any load in a portable electronic device, such as a battery. The receiving circuitry is adapted to convert the induced current into a form that is appropriate for the load. In some IPT systems, the receiving coils may be connected to capacitors (not shown) in either parallel or series to create a resonant circuit.

Figure 3:
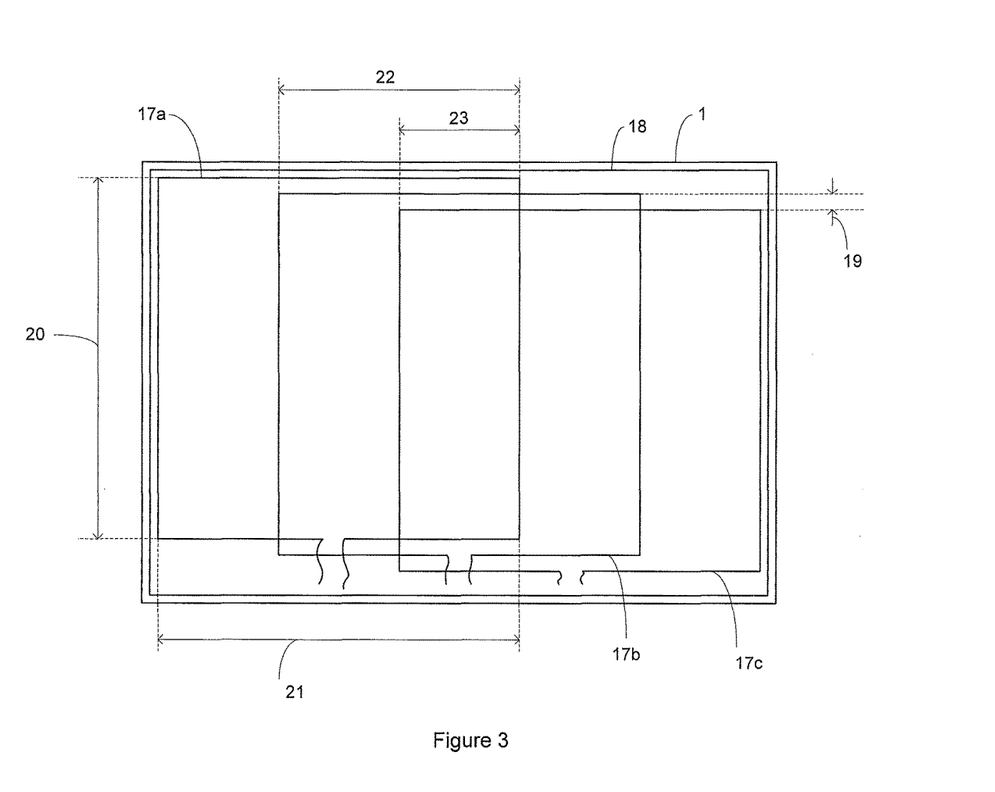
FIG. 3 shows the charging mat of FIG. 1 according to one embodiment.

FIG. 3 shows the charging mat 1 of FIG. 1 with the charging surface removed to expose the underlying transmitting coils 17a 17b 17c according to one embodiment. Each transmitting coil is suitably connected to the transmitting circuit (not shown). For simplicity, the transmitting coils in FIG. 3 are shown as single loops; however it will be appreciated that typically a single transmitting coil will consist of a series of loops. The transmitting coils may be made from any suitable material, such as copper or litz wire. The transmitting coils may be wound around a magnetically permeable layer. Alternatively (or in addition), as shown in FIG. 3, the charging mat 1 may include a magnetically permeable layer 18 behind the transmitting coils. In one embodiment, the magnetically permeable layer may be made from a ferrite material. It will also be appreciated that there may be other suitable arrangements of magnetically permeable material, and the invention is not limited in this respect.

The transmitting coils 17a 17b 17c are arranged in a row. For the sake of clarity, each transmitting coil is shown in FIG. 3 as slightly offset as indicated by the slight separation 19 so that each transmitting coil can be distinguished in the figure. Such an offset may also be practically necessary so that the transmitting coils can fit into the sometimes narrow volume of the charging mat. Nevertheless, it will be understood that notwithstanding the slight offset the transmitting coils are arranged in a row that is generally parallel with the charging surface length 5.

Each transmitting coil 17a 17b 17c is generally the same size and shape. In this embodiment, the transmitting coils are rectangular, with a transmitting coil length 20 that roughly corresponds to the charging surface width 6 and a transmitting coil width 21 that is roughly three-fifths of the charging surface length. The transmitting coils are generally coplanar with the charging surface of the charging mat 1.

In one embodiment, each transmitting coil partially overlaps with adjacent transmitting coils in the row. For example, transmitting coil 17a overlaps with transmitting coil 17b as shown by the overlap separation 22. The partial overlap between each transmitting coil may be the same such that the transmitting coils are regularly distributed in the row. However, those skilled in the art will appreciate that it may be possible to have transmitting coils arranged in a row where the partial overlaps are such that the transmitting coils are irregularly distributed in the row.

In a further embodiment, each transmitting coil may partially overlap with every transmitting coil in the row. For example, transmitting coil 17a overlaps with transmitting coil 17b and also overlaps with transmitting coil 17c as shown by the overlap separation 23. It will be appreciated that the overlap separation 21 between transmitting coil 17a and immediately adjacent transmitting coil 17b is two thirds of the transmitting coil width.

Each transmitting coil 17a 17b 17c is suitably connected to a transmitting circuit (not shown in FIG. 3). As discussed in reference to FIG. 2, the transmitting circuit drives the transmitting coils with an alternating current such that the transmitting coils generate an alternating magnetic field. The transmitting circuit drives the transmitting coils so that each transmitting coil's alternating magnetic field is phase shifted with respect to the alternating magnetic field of adjacent transmitting coils in the row. In a particular embodiment, the transmitting circuit drives the transmitting coils so that each transmitting coil's alternating magnetic field is phase shifted 60 degrees with respect to the alternating magnetic field of adjacent transmitting coils in the row. For example, according to one embodiment, the alternating magnetic field of transmitting coil 17a may be phase shifted 60 degrees with respect to the alternating magnetic field of transmitting coil 17b, and the alternating magnetic field of transmitting coil 17b may be phase shifted 60 degrees with respect to the alternating magnetic field of transmitting coil 17c, and thus the alternating magnetic field of transmitting coil 17c may be phase shifted 240 with respect to the alternating magnetic field of transmitting coil 17a.

Those skilled in the art will appreciate that there are many suitable transmitting circuits that may be adapted to drive the transmitting coils with a suitable phase shift, and the invention is not limited in this respect. In one embodiment, a single transmitting circuit may be adapted to drive the transmitting coils with a multiphase signal. In another embodiment, there may be separate transmitting circuits for each transmitting coil. The transmitting circuit may be a suitable converter adapted to generate an alternating current for driving the transmitting coils. As indicated in reference to FIG. 2, the transmitting coils may be connected in parallel or in series to a capacitor to create a resonant circuit. Such a capacitor may be incorporated into the transmitting circuit. Also as indicated in reference to FIG. 2, the transmitting circuit(s) may be connected to a suitable controller. The controller may be adapted to control the transmitting circuits so that they generate an output alternating current for driving the transmitting coils with suitable amplitude and frequency. Where there is a separate transmitting circuit for each transmitting coil the controller may control each transmitting circuit to ensure the correct phase shift between the transmitting circuits.

Having discussed the general configuration of the inductive power transmitter (i.e. the transmitting coils and the transmitting circuit) it is helpful to now consider the effects of this configuration with respect to the inductive power transmitter. It will be appreciated that due to the spatial difference and phase shift between the transmitting coils, the alternating magnetic field generated in the vicinity of the charging surface will, effectively, 'travel' along the charging surface in a direction parallel to the row of transmitting coils. This will be described in more detail below.

Figure 4:
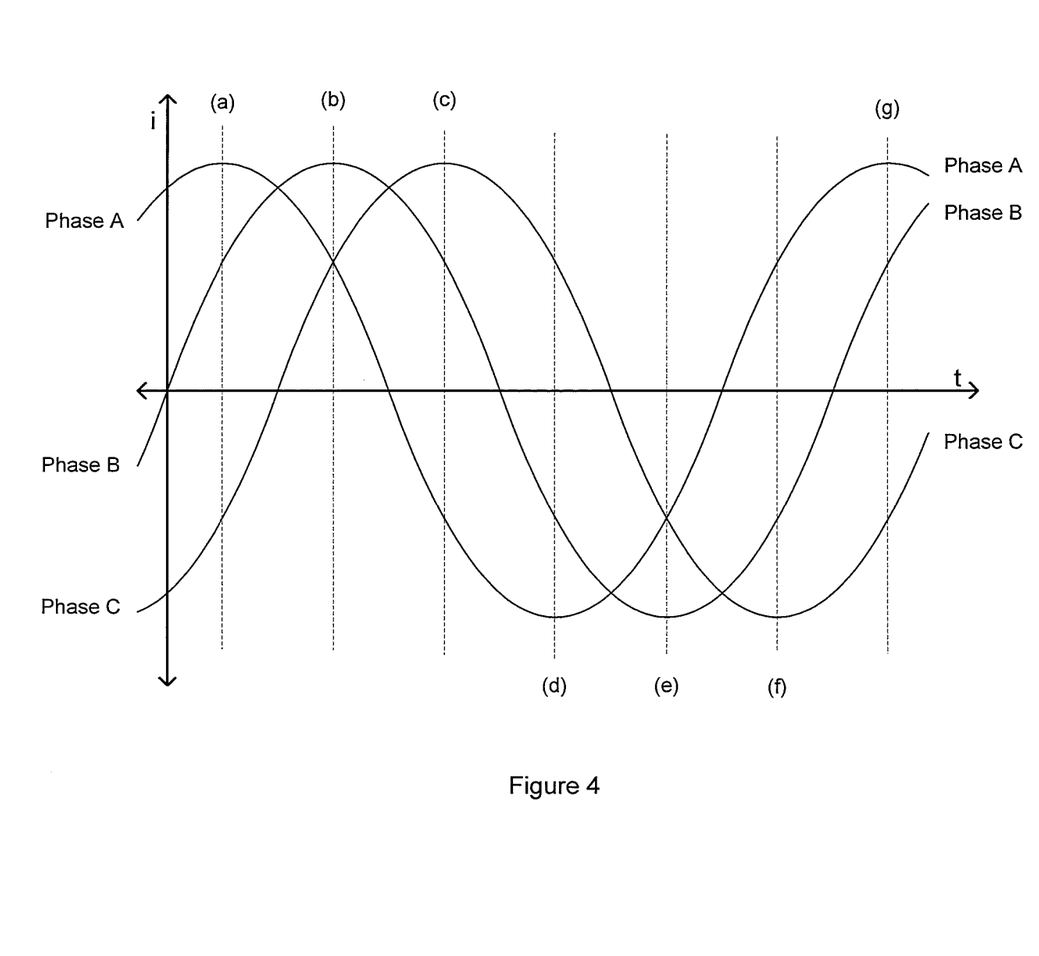
FIG. 4 shows a graph representing the currents supplied to each transmitting coil of the charging mat of FIG. 3 according to one embodiment.

FIG. 4 shows a graph representing the currents supplied to each transmitting coil of the charging mat of FIG. 3. Phase A is connected to transmitting coil 17a, phase B is connected to transmitting coil 17b and phase C is connected to transmitting coil 17c.

FIGS. 5a to 5g show a cross-section of the charging mat 1 of FIG. 3, showing a general representation of the resultant magnetic flux corresponding to times (a)-(g) on FIG. 4. For example, at time t=(a), the current through phase A is maximum and positive, and therefore the resultant magnetic flux 24 is generally positive above transmitting coil 17a. There will be a minor cancelling effect from the flux of transmitting coil 17c due to phase C being negative.

Figures 5A, 5B, 5C, 5D:
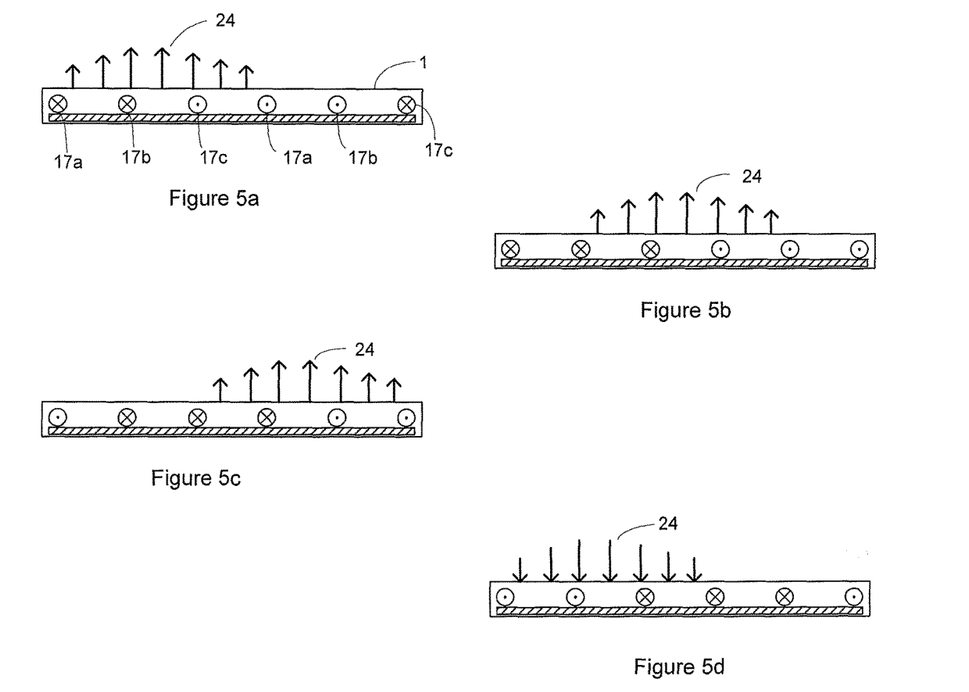
FIGS. 5a-5g show a cross-section of the charging mat of FIG. 3.
Figure 5E:
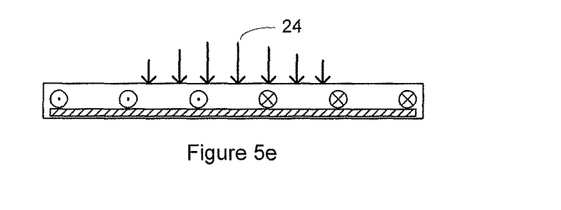
Figure 5F:
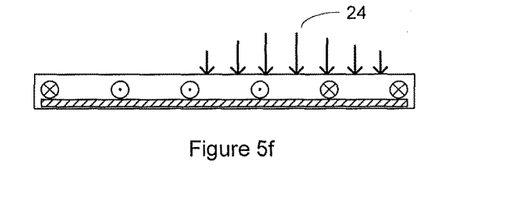
Figure 5G:
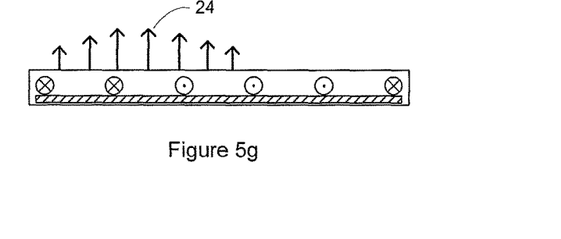

At time t=(b), the current through phase B is now maximum and positive, and therefore the resultant magnetic flux 24 is generally positive above transmitting coil 17b. Similarly, at time t=(c), the current through phase C is maximum and positive and therefore the resultant magnetic flux is generally positive above transmitting coil 17c.

At time t=(d), the direction of the resultant flux reverses. The current through phase A is now maximum and negative, so the resultant magnetic flux 24 is generally negative above transmitting coil 17a. At time t=(e), the current through phase B is now maximum and negative, and therefore the resultant magnetic flux is generally negative above transmitting coil 17b. At time t=(f), the current through phase C is now maximum and negative, and therefore the resultant magnetic flux is generally negative above transmitting coil 17c. Finally, at time t=(g), the current through phase A is maximum and positive again, and we return to the starting point as discussed in relation to FIG. 5a.

It will thus be appreciated that the resultant magnetic flux will not only be present over the entire charging surface for some part of the cycle, it will also 'travel' from transmitting coil 17a, to transmitting coil 17b, to transmitting coil 17c. Thus, there are no deadspots on the charging surface. Therefore, a receiver with a suitable receiving coil placed anywhere on the charging surface will pickup power from the inductive power transmitter. Further since the change in magnetic flux is not only in a direction perpendicular to the charging surface but also in a direction parallel to the charging surface (i.e. parallel with the direction of the row of transmitting coils), a receiving coil may pick up power even if it is not coplanar with the transmitting coils.

Figure 6:
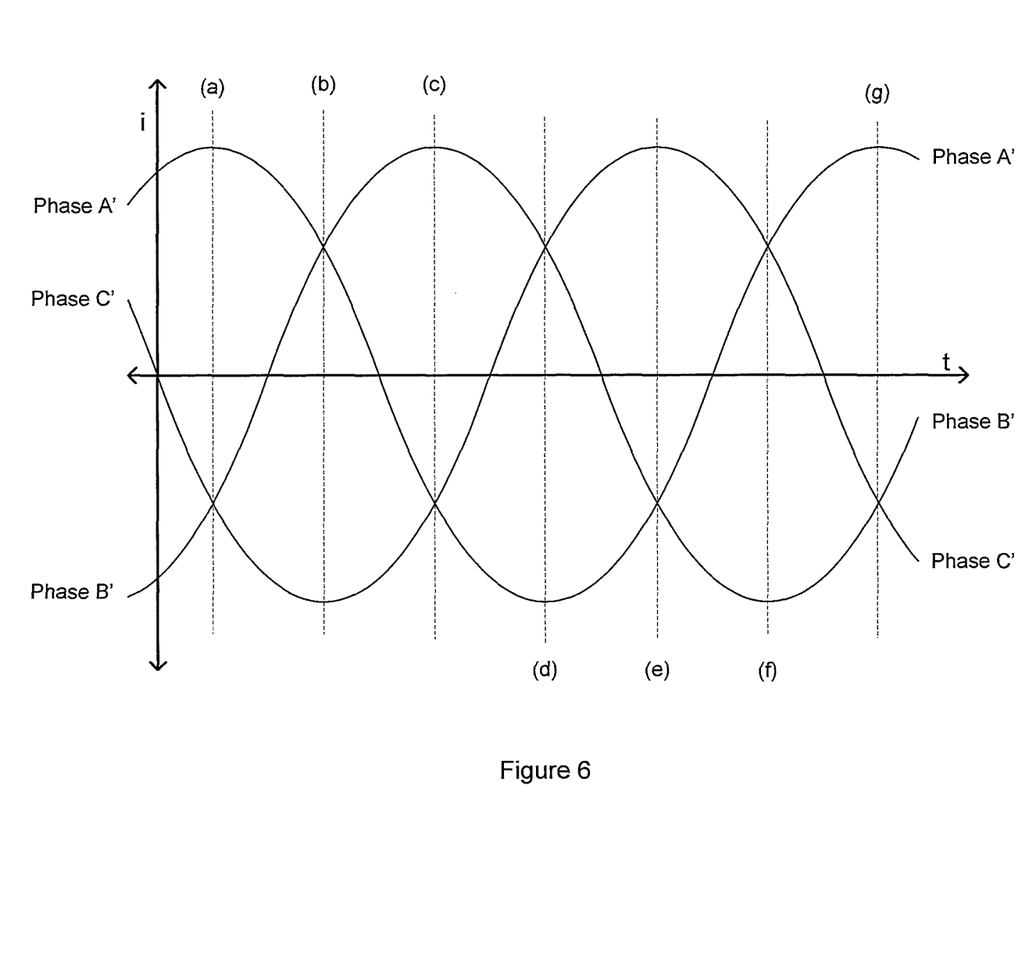
FIG. 6 shows a graph representing the currents supplied to each transmitting coil of the charging mat of FIG. 3 according to another embodiment.

In another embodiment, it may be possible to supply the transmitting coils with a multiphase signal where each phase is phase shifted 120 degrees. This is particularly beneficial since it corresponds to commonly available or produced three-phase power. Further, it may simplify the control of the transmitting circuit. FIG. 6 shows a graph representing the currents supplied to each transmitting coil of the charging mat of FIG. 3 according to another embodiment. In this embodiment, phase A' is supplied to transmitting coil 17a, phase B' is supplied to transmitting coil 17c, and phase C' is supplied to transmitting coil 17b. Importantly, the polarity of transmitting coil 17b is reversed. It will be appreciated that this configuration then results in effective currents through transmitting coils 17a-17b and resultant magnetic flux as shown and discussed in relation to FIGS. 4 and 5a-5g.

Figure 7:
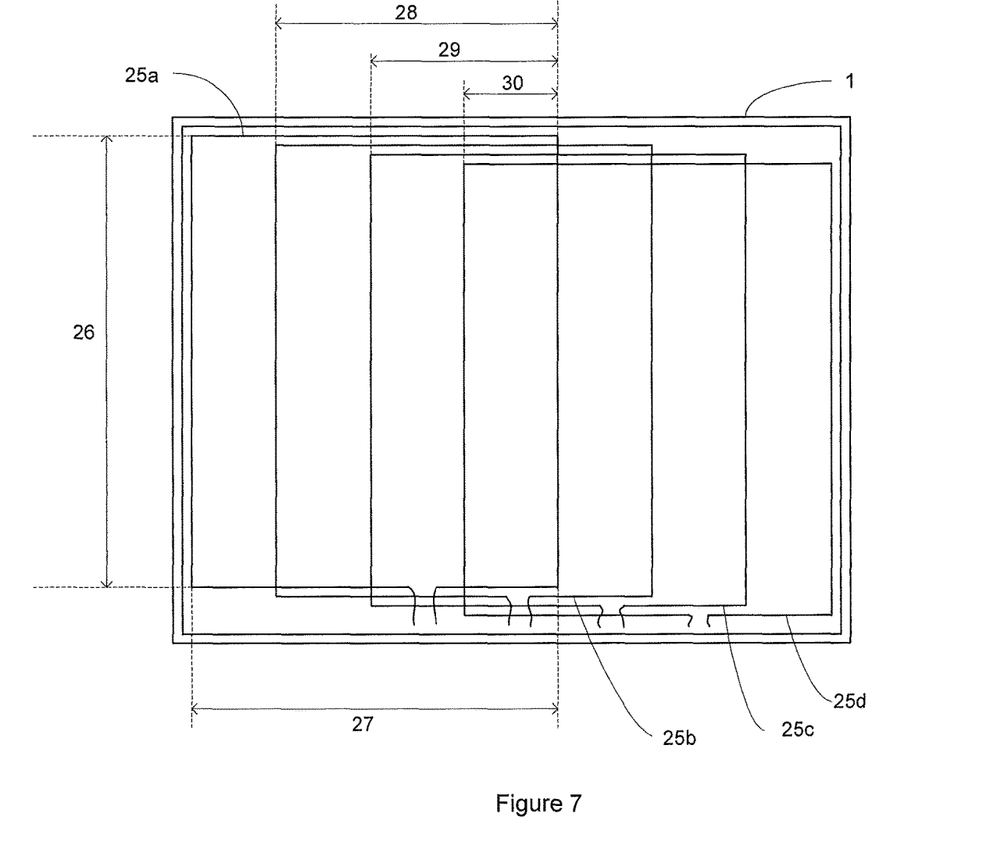
FIG. 7 shows the charging mat of FIG. 1 according to another embodiment.

Referring to FIG. 7, there is shown another embodiment of the charging mat 1 of FIG. 1 with the charging surface removed to expose the underlying transmitting coils 25a 25b 25c 25d. Each transmitting coil is suitably connected to the transmitting circuit (not shown). The transmitting coils are arranged in a row.

Each transmitting coil 25a 25b 25c 25d is generally the same shape and size. In this embodiment, the transmitting coils are rectangular, with a transmitting coil length 26 that roughly corresponds to the charging surface width 6 and a transmitting coil width 27 that is roughly four-sevenths of the charging surface length.

In one embodiment, each transmitting coil partially overlaps with adjacent transmitting coils in the row. For example, transmitting coil 25a overlaps with transmitting coil 25b as shown by the overlap separation 28. The partial overlap between each transmitting coil may be the same such that the transmitting coils are regularly distributed in the row. However, those skilled in the art will appreciate that it may be possible to have transmitting coils arranged in a row where the partial overlaps are such that the transmitting coils are irregularly distributed in the row.

In a further embodiment, each transmitting coil may partially overlap with every transmitting coil in the row. For example, transmitting coil 25a overlaps with transmitting coil 25b and also overlaps with transmitting coil 25c as shown by the overlap separation 29 and with transmitting coil 25d as shown by the overlap separation 30. It will be appreciated that the overlap separation 28 between transmitting coil 25a and immediately adjacent transmitting coil 25b is three quarters of the transmitting coil width.

Each transmitting coil 25a 25b 25c 25d is suitably connected to a transmitting circuit (not shown in FIG. 7). The transmitting circuit will be same as that discussed in relation to FIG. 3, however in this instance the transmitting circuit drives the transmitting coils so that each transmitting coil's alternating magnetic field is phase shifted 45 degrees with respect to the alternating magnetic field of adjacent transmitting coils in the row.

Figure 8:
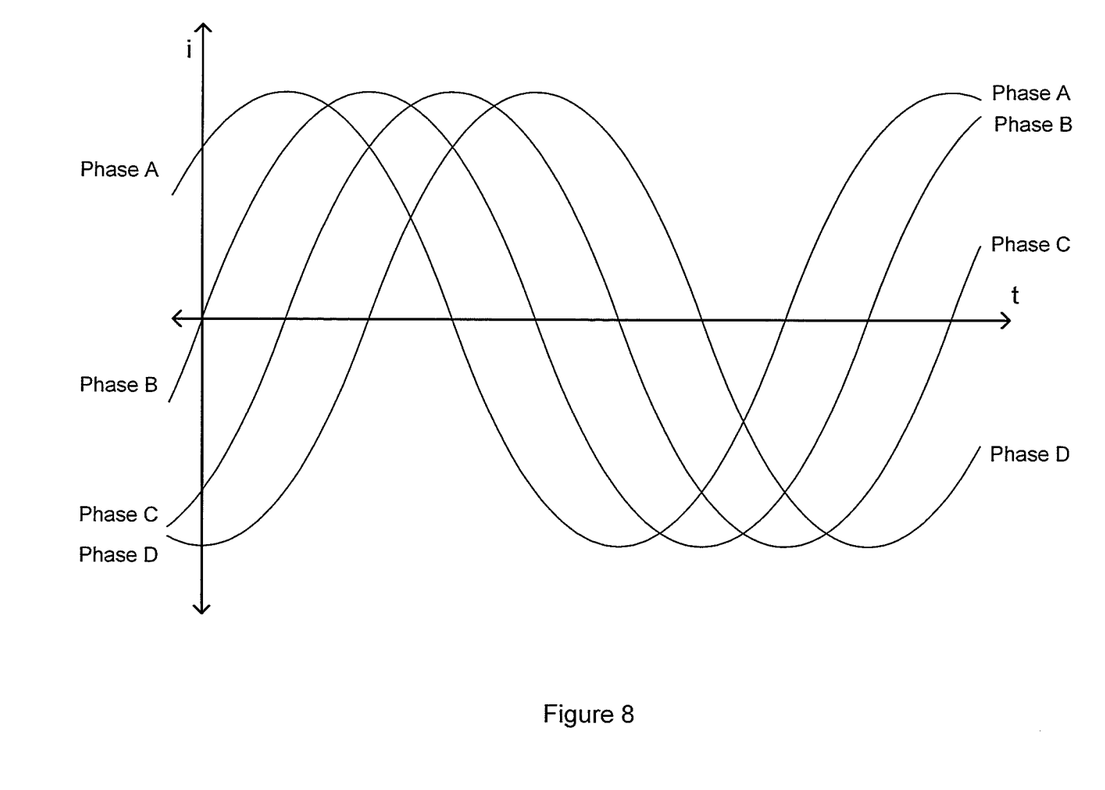
FIG. 8 shows a graph representing the currents supplied to each transmitting coil of the charging mat of FIG. 7 according to one embodiment.

FIG. 8 shows a graph representing the currents supplied to each transmitting coil of the charging mat of FIG. 7. Phase A is connected to transmitting coil 25a, phase B is connected to transmitting coil 25b, phase C is connected to transmitting coil 25c and phase D is connected to transmitting coil 17d. It will be appreciated how this will give a resultant magnetic flux that travels along the charging surface in an analogous manner to that discussed in relation to FIGS. 5a-5g.

It will further be appreciated that the invention is not limited to three of four transmitting coils, and may in fact be applied to any number of transmitting coils arranged in a row. By comparison of the discussion of FIG. 3 and FIG. 7, some general rules begin to emerge. Those skilled in the art will appreciate how the following rules may need to be adapted depending on the unique characteristics of any particular application.

The transmitting coil width is $n/(2n-1)$ of the charging surface length, where n is the number of transmitting coils in the row.

The transmitting coil partially overlaps with immediately adjacent transmitting coils by $(n-1)/n$ of the transmitting coil width, where n is the number of transmitting coils in the row. More generally, a first transmitting coil in the row and a second transmitting coil in the row overlaps by $(n-m-1)/n$ of the transmitting coil width where n is the number of transmitting coils, and m is the number of transmitting coils between the first transmitting coil and the second transmitting coil.

Finally, the transmitting circuit drives transmitting coils such that the each transmitting coil's alternating magnetic field is phase shifted $180/n$ degrees with respect to the immediately adjacent transmitting coil's alternating magnetic field.

In the embodiments of the invention shown in FIG. 3 and FIG. 7, there is only one row of transmitting coils where each transmitting coil partially overlaps with adjacent transmitting coils in the row. In another embodiment, it may be possible to have two or more rows of transmitting coils depending on the particular requirements of the inductive power transmitter. For example, in one embodiment, it may be possible to have two or more parallel rows of transmitting coils in a side-by-side arrangement. In another embodiment, it may be possible to have two or more collinear rows of transmitting coils in an end-to-end arrangement.

Figure 9:
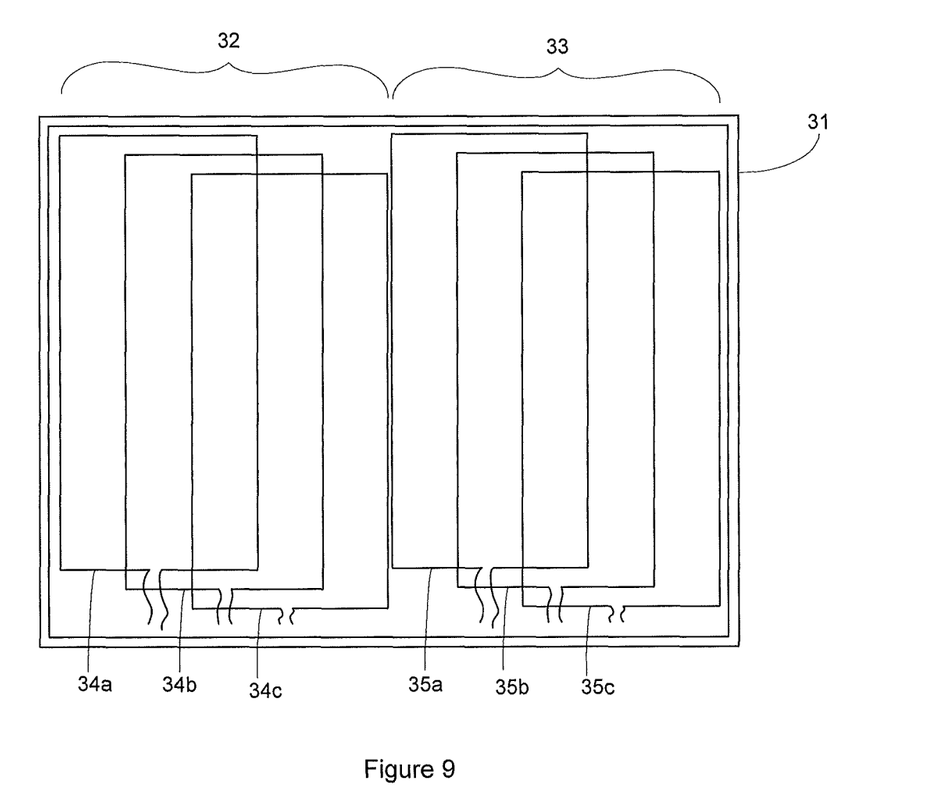
FIG. 9 shows the charging mat of FIG. 1 according to a further embodiment.

FIG. 9 shows a charging mat 31 with a first row 32 and a second row 33 of transmitting coils. Each row has three transmitting coils 34a 34b 34c and 35a 35b 35c respectively. It will be appreciated that these transmitting coils are analogous to the transmitting coils shown in FIG. 3. It will be appreciated that due to other constraints it may be preferable to make the transmitting coils smaller so that two or more rows of transmitting coils can fit in the confines of the charging mat.

In the embodiment shown in FIG. 9, each corresponding coil may be driven by the same signal from the transmitting circuit (or alternatively, a signal that is in phase). That is to say, transmitting coil 34a and transmitting coil 35a may be driven by a signal with the same phase, transmitting coil 34b and transmitting coil 35b may be driven by a signal with the same phase, and transmitting coil 34c and transmitting coil 35c may be driven by a signal with the same phase. It will be appreciated that this results in a similar travelling field as described in relation to FIG. 3 and FIG. 7. However it will be appreciated that in this embodiment the inductive power transmitting will not be a two-pole system but, effectively, a four-pole system.

It will be appreciated that the inductive power transmitter described above results in an alternating magnetic field that travels across the charging surface of the charging mat. The overlap between the transmitting coils lessens the effect of deadspots that might normally occur between two adjacent transmitting coils. Together, this allows receivers (and associated portable electronic devices) to be placed anywhere on the charging surface of the charging mat to receive power. Further, due to the travelling magnetic field, the receiver can receive power with the receiving coil when it is coplanar with the transmitting coils but also in other orientations.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising:
    a plurality of transmitting coils configured to generate an alternating magnetic field, wherein each transmitting coil in the plurality of transmitting coils partially overlaps at least one other transmitting coil in the plurality of transmitting coils and wherein the transmitting coils in the plurality of transmitting coils are spatially offset in at least two dimensions with respect to each other; and
    transmitting circuitry coupled to each of the transmitting coils in the plurality of transmitting coils, wherein the transmitting circuitry is configured to drive the plurality of transmitting coils with a phase shift between adjacent transmitting coils in the plurality of transmitting coils, and wherein the alternating magnetic field generated by the plurality of transmitting coils travels along a surface of the inductive power transmitter.

2. The inductive power transmitter of claim 1, wherein the inductive power transmitter includes a magnetically permeable layer.

3. The inductive power transmitter of claim 1, wherein the plurality of transmitting coils are arranged in a row and there is only one row of transmitting coils in the inductive power transmitter.

4. The inductive power transmitter of claim 1, wherein the plurality of transmitting coils are arranged in a row and there are at least two rows of transmitting coils in the inductive power transmitter.

5. The inductive power transmitter of claim 1, wherein the transmitting coils in the plurality of transmitting coils are arranged in a row with a regular distribution.

6. The inductive power transmitter of claim 1, wherein the plurality of transmitting coils are arranged in a row and each transmitting coil in the row partially overlaps all other transmitting coils in the row.

7. The inductive power transmitter of claim 1, wherein the plurality of transmitting coils are arranged in a row and each transmitting coil in the row is the same size.

8. The inductive power transmitter of claim 1, wherein the plurality of transmitting coils are arranged in a row and each transmitting coil in the row is defined by a transmitting coil width parallel to a direction of the row and a transmitting coil length perpendicular to the direction of the row.

9. The inductive power transmitter of claim 8, wherein each transmitting coil in the row partially overlaps an immediately adjacent transmitting coil in the row by $(n-1)/n$ of the transmitting coil width, where n is the number of transmitting coils in the row.

10. The inductive power transmitter of claim 1, wherein the inductive power transmitter is incorporated into a charging mat having a charging surface.

11. The inductive power transmitter of claim 10, wherein the transmitting coils in the plurality of transmitting coils are coplanar with the charging surface.

12. The inductive power transmitter of claim 10, wherein the charging surface is defined by a charging surface length and a charging surface width.

13. The inductive power transmitter of claim 12, wherein the plurality of transmitting coils are arranged in a row and each transmitting coil in the row is defined by a transmitting coil width parallel to a direction of the row and a transmitting coil length perpendicular to the direction of the row.

14. The inductive power transmitter of claim 13, wherein the transmitting coil length is the same as the charging surface width.

15. The inductive power transmitter of claim 13, wherein the transmitting coil width is $n/(2n-1)$ of the charging surface length, where n is the number of transmitting coils in the row.

16. The inductive power transmitter of claim 1, wherein each transmitting coil in the plurality of transmitting coils is coupled to a resonant capacitor to create a resonant circuit.

17. The inductive power transmitter of claim 16, wherein each transmitting coil in the plurality of transmitting coils is coupled in parallel to the resonant capacitor.

18. The inductive power transmitter of claim 16, wherein each transmitting coil in the plurality of transmitting coils is coupled in series to the resonant capacitor.

19. The inductive power transmitter of claim 1, wherein each transmitting coil in the plurality of transmitting coils produces an alternating magnetic field that is phase shifted with respect to an alternating magnetic field produced by an immediately adjacent transmitting coil in the plurality of transmitting coils by $180/n$ degrees, where n is the total number of transmitting coils in the inductive power transmitter.

20. The inductive power transmitter of claim 1, wherein each transmitting coil in the plurality of transmitting coils is coupled to separate transmitting circuitry.

21. The inductive power transmitter of claim 1, wherein the transmitting circuitry comprises a single transmitting circuit shared by all of the transmitting coils in the plurality of transmitting coils and wherein the single transmitting circuit is adapted to generate a multiphase signal.

22. The inductive power transmitter of claim 1, wherein the plurality of transmitting coils comprises three transmitting coils arranged in a row.

* * * * *